Figure 1:
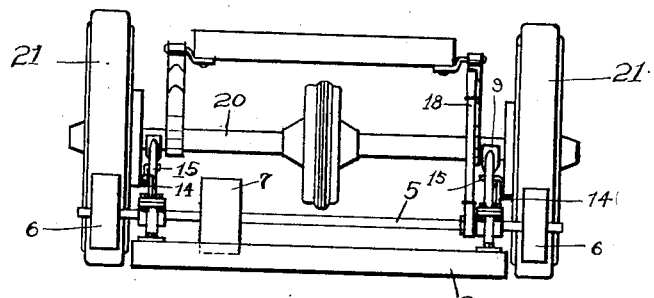

C. C. BUTLER.
POWER CONVERTER.
APPLICATION FILED JULY 1, 1919.

1,329,037.

Patented Jan. 27, 1920.

Inventor
C.C. Butler.
By C.A.Snow&Co.
Attorneys

UNITED STATES PATENT OFFICE.

CLINTON C. BUTLER, OF ANOKA, MINNESOTA.

POWER-CONVERTER.

1,329,037.   Specification of Letters Patent.   Patented Jan. 27, 1920.

Application filed July 1, 1919. Serial No. 307,912.

*To all whom it may concern:*

Be it known that I, CLINTON C. BUTLER, a citizen of the United States, residing at Anoka, in the county of Anoka and State of Minnesota, have invented a new and useful Power-Converter, of which the following is a specification.

This invention relates to improvements in power converters, the object of the invention being to provide an improved device of this character which is adapted to be driven by the driving wheels of an automobile, whereby the power of the automobile engine may be used for operating other machinery.

A further object of the invention is to provide a device of the character set forth which is comparatively simple in construction, inexpensive to manufacture and highly efficient in use.

With the foregoing and other objects in view, which will appear as the description proceeds, the invention consists in the novel features of construction and combination of parts which will be more fully described hereinafter and particularly pointed out in the claims.

Figure 2:
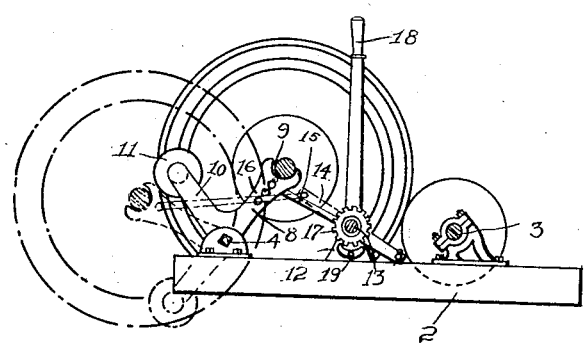

In the drawings accompanying and forming part of this specification,

Figure 1 is an end view showing the device in position to receive power from the rear wheels of an automobile; and Fig. 2 is a partly sectional side view showing in full lines the rear axle and wheels of the car in position to operate the device and in dotted lines in position to be released therefrom.

The same characters of reference designate the same parts in the different figures of the drawings.

Referring to the drawings, 2 designates a rectangular frame, on which are secured two pair of bearing brackets 3 and 4 respectively. In the brackets 3 is mounted a shaft 5 having secured at each end thereof a friction wheel 6 and at a point between the brackets a belt pulley 7. To the brackets 4 are pivotally secured a pair of members each having a lifting arm 8 provided at its upper end with a U-shaped recess 9 adapted to engage the rear axle of an automobile or other motor driven vehicle, each of said members having formed thereon a second arm 10 carrying at its free end a roller 11 adapted to contact with the ground so as to permit the rolling of the device into position beneath the vehicle. A third pair of bearing brackets 12 are secured to the side members of the frame and have mounted therein a shaft 13, on each end of which is secured an arm 14, to the opposite end of which is pivotally secured a connecting rod 15, the opposite end of which is adapted to engage one of a series of openings 16 formed in the lifting arm 8, whereby the lifting arm may be adjusted to suit wheels of different diameters. By this construction it will be seen that when the shaft 13 is rotated the lifting arms will be pulled backward or pushed forward, according to the direction of rotation of the shaft 13. For rotating the shaft, a ratchet wheel 17 is secured thereto, and a hand lever 18 is loosely mounted on the shaft and carries a pivoted double pawl 19 of ordinary construction, by means of which the ratchet teeth may be engaged to rotate the shaft in either direction.

When it is desired to use the automobile engine for operating machinery, the device is rolled up on its wheels 11 under the car until the U-shaped recesses 9 of the arms 8 engage the axle 20, whereupon the lever 18 is rocked back and forth, the rear pawl having first been set to engage the ratchet teeth. This will cause the shaft 13 to rotate backward and thereby pull the arms 8 back so as to raise the wheels 21 of the vehicle off the ground, this action being continued until the driving wheels of the car are in contact with the friction wheels 6, and the rear end of the connecting rod 15 falls down below the center line of shaft 12 locking the rod and mount against displacement. It will readily be seen that by starting the motor when the vehicle is in this position motion will be imparted, by means of the contact of the friction wheels 6 with the driving wheels of the vehicle, to the shaft 5 and thereby, through the medium of its pulley 7 and a belt, (not shown), to any machinery which it may be desired to operate. The arms 8 are retained in elevated position by reason of the fact that the arms 14 are brought into position in line with the connecting rods 15 and the lifting arms thereby swung backward beyond a vertical line passing through their axes, as shown in full lines in Fig. 2, so that the weight of the car itself serves to retain the wheels in contact with the friction wheels 6. For lowering the arms 8 so as to release the car, the double pawl is set so that the front portion thereof engages the ratchet, while the rear portion of the pawl is inactive, whereupon, by continuing to operate the lever the shaft 13 will be rotated in the opposite direction, thereby swinging the arms 8 forward and lowering them to the position shown in dotted lines in Fig. 2.

While I have described in detail the structure herein illustrated, it is to be understood that I do not thereby limit my invention to the precise features of construction shown, as I am aware that many mechanical changes and modifications may be made therein without departing from the spirit and scope of the invention as pointed out in the claims hereto appended.

Having thus described my invention, what I claim is:

1. The combination with a motor-driven vehicle having an axle and a pair of driving wheels, of a frame, a shaft mounted for rotation thereon and having secured thereto a pair of friction wheels adapted to contact with said driving wheels for receiving motion therefrom, a pair of arms pivotally secured to said frame and adapted to engage said axle, a second shaft mounted for rotation on said frame, a pair of arms secured to said shaft, a connecting rod between each of said arms and each of said axle-engaging arms, and means for rotating said last mentioned shaft.

2. The combination with a motor-driven vehicle having an axle and a pair of driving wheels, of a frame, a shaft mounted for rotation thereon and having secured thereto a pair of friction wheels adapted to contact with said driving wheels for receiving motion therefrom, a pair of arms pivotally secured to said frame and adapted to engage said axle, a second shaft mounted for rotation on said frame, a pair of arms secured to said shaft, a connecting rod between each of said arms and each of said axle-engaging arms, a ratchet wheel secured to the first-mentioned shaft, a hand lever loosely mounted on said shaft, and a pawl carried by the lever and adapted to engage said ratchet wheel to rotate the same in either direction.

3. In a power transmitting device, a frame, bearing brackets supported by the frame, a pair of arms supported within the brackets at each side of the frame, each of said pair of arms including a lifting arm and a supporting arm, a shaft supported by the frame, means for rotating the shaft, means having connection with the shaft and lifting arm to cause the lifting arm to swing with relation to the frame upon rotation of said shaft to lift a vehicle engaging the lifting arms and simultaneously move the supporting arms out of operation, and friction wheels supported by the frame.

4. In a power transmitting device, a frame, a pair of arms supported adjacent each side of the frame, a roller supported by one of the arms of each pair for permitting the frame to be moved along the surface on which the same is supported, a lifting arm forming one of the arms of each pair, said lifting arm having a plurality of spaced openings, a shaft supported on the frame, a connecting rod having connection with the shaft, one end of said connecting rod being disposed within one of the apertures of the lifting arm, a shaft supported on the frame, an arm connected to the shaft to rotate therewith, said arm having connection with the connecting rod, means for rotating the shaft to cause a swinging movement of the pairs of arms, and friction wheels supported by the frame.

In testimony that I claim the foregoing as my own, I have hereto affixed my signature in the presence of two witnesses.

CLINTON C. BUTLER.

Witnesses:
 ALBERT F. PRATT,
 F. C. WHEAT.